United States Patent
Jia

(10) Patent No.: US 8,736,124 B2
(45) Date of Patent: May 27, 2014

(54) MOUNTING BRACKET FOR MOTOR

(75) Inventor: Hongyu Jia, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 0 days.

(21) Appl. No.: 13/300,646

(22) Filed: Nov. 20, 2011

(65) Prior Publication Data

US 2012/0132783 A1 May 31, 2012

(30) Foreign Application Priority Data

Nov. 29, 2010 (CN) .......................... 2010 1 0577834

(51) Int. Cl.
*H02K 5/00* (2006.01)
(52) U.S. Cl.
USPC ............... 310/91; 310/89; 310/413; 310/415; 310/418; 248/674
(58) Field of Classification Search
CPC .................................. F16M 7/00; H02K 5/00
USPC ............... 248/674, 680, 68.1, 65, 62, 226.11, 248/230.1, 230.6, 230.7, 231.71, 311.2, 248/312, 312.1; 310/89, 91, 413, 415, 418; 417/360, 423.15
See application file for complete search history.

(56) References Cited

U.S. PATENT DOCUMENTS

| | | | | |
|---|---|---|---|---|
| 2,669,729 | A * | 2/1954 | Stader | 384/27 |
| 3,903,443 | A * | 9/1975 | Carlson | 310/91 |
| 4,019,704 | A * | 4/1977 | Levine | 248/637 |
| 4,293,114 | A * | 10/1981 | Lykes | 248/604 |
| 4,572,472 | A * | 2/1986 | Eder | 248/605 |
| 4,676,473 | A * | 6/1987 | Giles | 248/638 |
| 4,759,526 | A * | 7/1988 | Crawford et al. | 248/604 |
| 5,069,415 | A * | 12/1991 | Mechalas | 248/674 |
| 5,470,207 | A * | 11/1995 | Shockey et al. | 417/313 |
| 6,761,343 | B2 * | 7/2004 | Clark et al. | 248/674 |
| 7,044,428 | B2 * | 5/2006 | Michel et al. | 248/680 |
| 7,513,754 | B2 * | 4/2009 | Clark et al. | 417/360 |
| 2006/0125330 | A1 * | 6/2006 | Winkler et al. | 310/51 |
| 2006/0175504 | A1 * | 8/2006 | Talaucher et al. | 248/309.1 |
| 2012/0139373 | A1 * | 6/2012 | Jia et al. | 310/89 |

* cited by examiner

*Primary Examiner* — Terrell McKinnon
*Assistant Examiner* — Michael McDuffie
(74) *Attorney, Agent, or Firm* — Matthias Scholl P.C.; Matthias Scholl

(57) ABSTRACT

A mounting bracket for a motor, including a hoop structure and a plurality of mounting feet. The hoop structure includes a wall surface. The wall surface of the hoop structure includes the mounting feet formed by punching the wall surface of the hoop structure so that a plurality of grooves close to the mounting feet is produced on the wall surface of the hoop structure, and one end of each mounting foot is coupled to the wall surface of the hoop structure. The mounting bracket for a motor of the invention has a simple structure, low cost, and reliable connection and requires less material compared to conventional mounting brackets. The mounting bracket is suitable for different types of motors.

13 Claims, 6 Drawing Sheets

MOUNTING BRACKET FOR MOTOR

CROSS-REFERENCE TO RELATED APPLICATIONS

Pursuant to 35 U.S.C. §119 and the Paris Convention Treaty, this application claims the benefit of Chinese Patent Application No. 201010577834.0 filed Nov. 29, 2010, the contents of which are incorporated herein by reference.

BACKGROUND OF THE INVENTION

1. Field of the Invention

The invention relates to a mounting bracket for a motor.

2. Description of the Related Art

Conventionally, a mounting bracket for a motor is directly coupled to a motor by means of welding or riveting, or a plurality of threaded holes are disposed on a mounting bracket for a motor and then the mounting bracket is fixed on a motor using bolts and nuts. However, such structure is complicated and incompatible to different types of motors. In the prior art, a mounting bracket suitable for different types of motors has been disclosed, but with the following disadvantages: mounting feet of the mounting bracket are fixed on a hoop structure of the mounting bracket by welding or riveting, thus the working procedure is complicated, many materials are required, production costs are high, and the mounting brackets are easily to come off.

SUMMARY OF THE INVENTION

In view of the above-described problems, it is one objective of the invention to provide a mounting bracket for a motor that has a simple structure, low cost, and reliable connection and requires less material compared to conventional mounting brackets, and suitable for different types of motors.

To achieve the above objective, in accordance with one embodiment of the invention, there provided is a mounting bracket for a motor, comprising a hoop structure and a plurality of mounting feet, the hoop structure comprising a wall surface, wherein the wall surface of the hoop structure comprises the mounting feet formed by punching the wall surface of the hoop structure so that a plurality of grooves close to the mounting feet is produced on the wall surface of the hoop structure, and one end of each mounting foot is coupled to the wall surface of the hoop structure.

In a class of this embodiment, the hoop structure is in a closed annular shape encircling the surface of a motor casing and the hoop structure is connected with the motor casing using an interference fit.

In a class of this embodiment, the hoop structure is in an annular shape having an opening and arranged with a locking device; the locking device comprises two clamping plates disposed at the opening of the hoop structure, and the two clamping plates are tightly locked together using a bolt and a nut.

In a class of this embodiment, the mounting feet each comprises a fixed part, a middle connecting part, and a mounting part; one end of the fixed part is coupled to the hoop structure and the other end is coupled to the middle connecting part, an outer end of the middle connecting part is coupled to the mounting part, and the middle connecting part is in a twisted shape.

In a class of this embodiment, the mounting feet are in the same section of the wall surface of the hoop structure and spaced apart along the circumferential direction.

In a class of this embodiment, the number of the mounting feet is three and two adjacent mounting feet form an angle of 120°.

In a class of this embodiment, the hoop structure encircles the motor casing and the motor is locked by the locking device.

Advantages of the invention are summarized below:

1) the wall surface of the hoop structure is punched to produce a plurality of mounting feet, and thus a plurality of grooves close to the mounting feet are formed on the wall surface of the hoop structure and one end of each mounting foot is coupled to the wall surface of the hoop structure. The mounting feet are made by parts of the hoop structure and have a desired size. Thus, materials are saved, costs are reduced, connection becomes reliable, and market competitiveness of the motor are enhanced ;
2) the mounting feet each comprises a fixed part, a middle connecting part, and a mounting part; one end of the fixed part is coupled to the hoop structure and the other end is coupled to the middle connecting part, an outer end of the middle connecting part is coupled to the mounting part and the middle connecting part is in a twisted shape. Such structure is more tight and secure and potential safety hazard due to second time connection has been reduced;
3) the mounting feet are in the same section of the wall surface of the hoop structure and spaced apart along the circumferential direction. The number of the mounting feet is three and two adjacent mounting feet form an angle of 120°. The stress of such structure is even and the motor can be stably fixed on an external devices;
4) the hoop structure is in a closed annular shape encircling the surface of the motor casing and an interference fit is achieved between the hoop structure and the motor casing. It is installation friendly and production efficiency has been improved; and
5) the hoop structure is arranged with a locking device, which comprises two clamping plates disposed at the opening of the hoop structure, and the two clamping plates can be tightly locked together by a bolt and a nut. The hoop structure encircles the motor casing and the motor can be locked by the locking device. It is an extremely versatile structure and applicable to different types of motors. Thus, money can be saved because no mounting brackets need replacing.

DETAILED DESCRIPTION OF THE EMBODIMENTS

For further illustrating the invention, experiments detailing a mounting bracket for a motor are described below. It should be noted that the following examples are intended to describe and not to limit the invention.

Example 1

Figure 1:
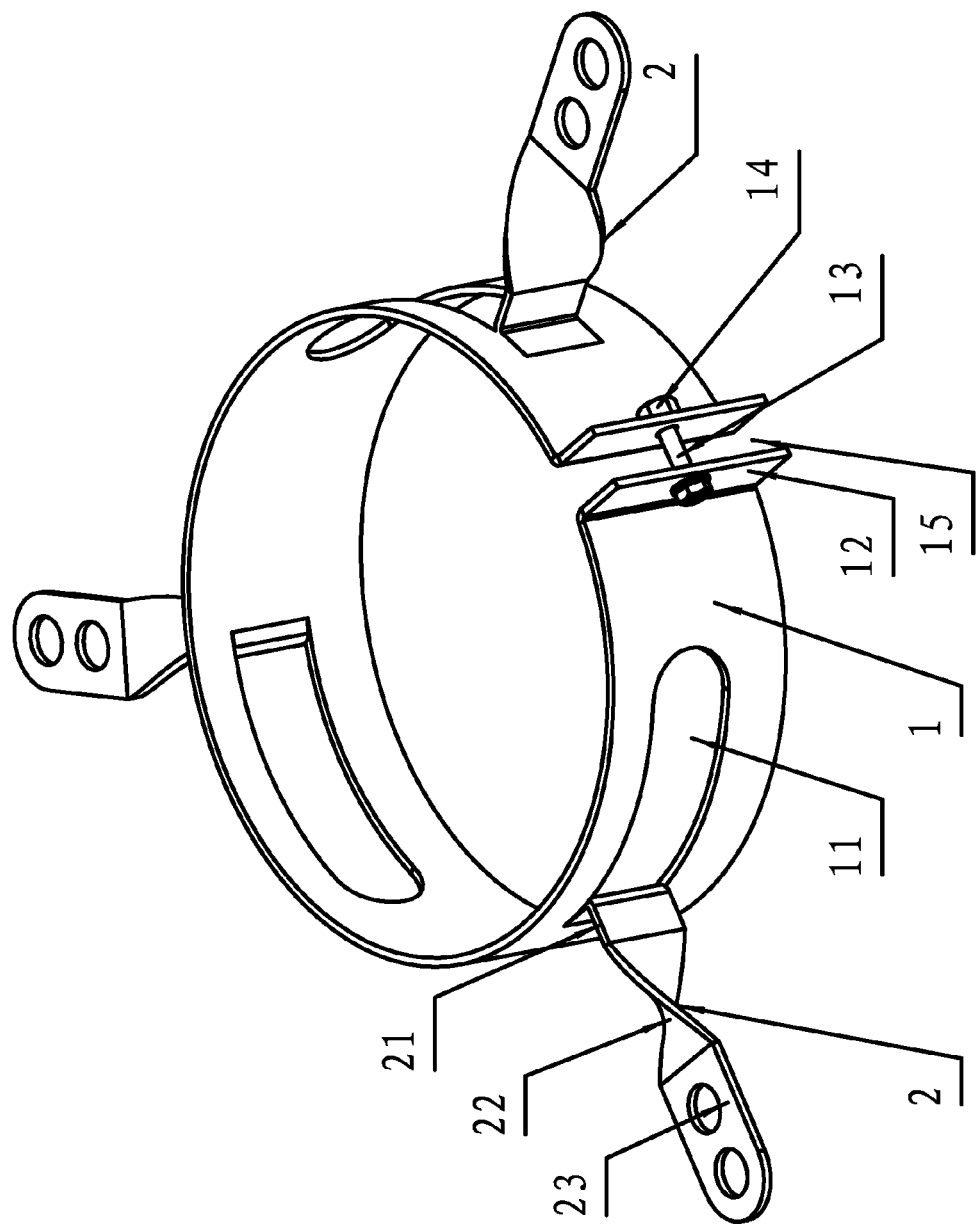
FIG. 1 is a three-dimensional diagram of a mounting bracket for a motor in accordance with one embodiment of the invention.
Figure 2:
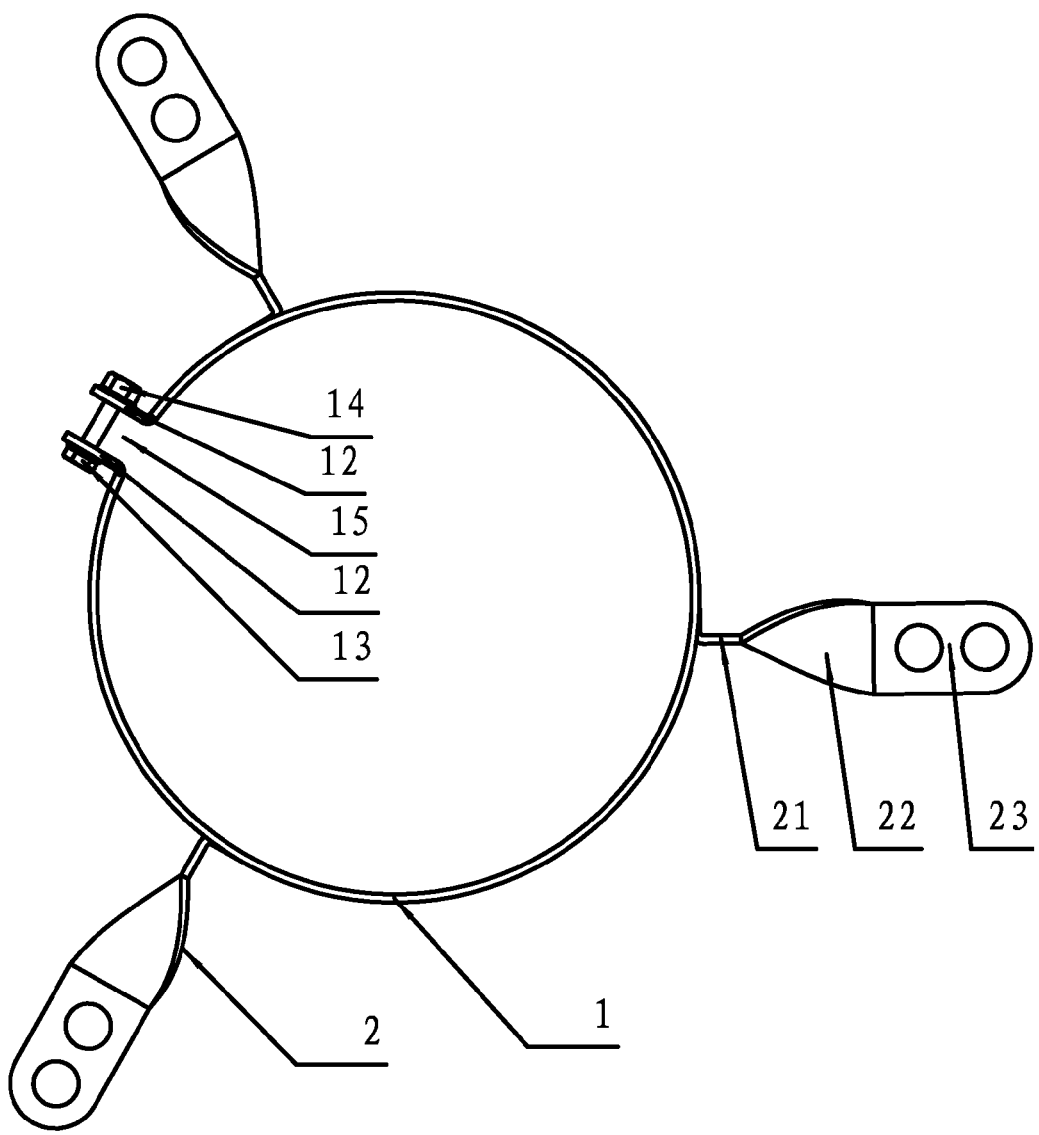
FIG. 2 is a front view of a mounting bracket for a motor in accordance with one embodiment of the invention.

As shown in FIGS. 1 and 2, a mounting bracket for a motor of the invention comprises a hoop structure 1 and a plurality of mounting feet 2. The hoop structure 1 comprises a wall surface which is punched to produce a plurality of mounting feet 2. Thus, a plurality of grooves 11 close to the mounting feet 2 are formed on the wall surface of the hoop structure 1 and one end of each mounting foot 2 is coupled to the wall surface of the hoop structure 1. The hoop structure 1 is in an annular shape having an opening 15 and arranged with a locking device. The locking device comprises two clamping plates 12 at the opening 15 of the hoop structure 1, and the two clamping plates 12 can be tightly locked together by a bolt 13 and a nut 14. The mounting feet 2 each comprises a fixed part 21, a middle connecting part 22, and a mounting part 23. One end of the fixed part 21 is coupled to the hoop structure 1 and the other end is coupled to the middle connecting part 22. An outer end of the middle connecting part 22 is coupled to the mounting part 23 and the middle connecting part 22 is in a twisted shape. The mounting feet 2 are in the same section of the wall surface of the hoop structure 1 and spaced apart along the circumferential direction. The number of the mounting feet 2 is three and two adjacent mounting feet 2 form an angle of 120°.

Figure 3:
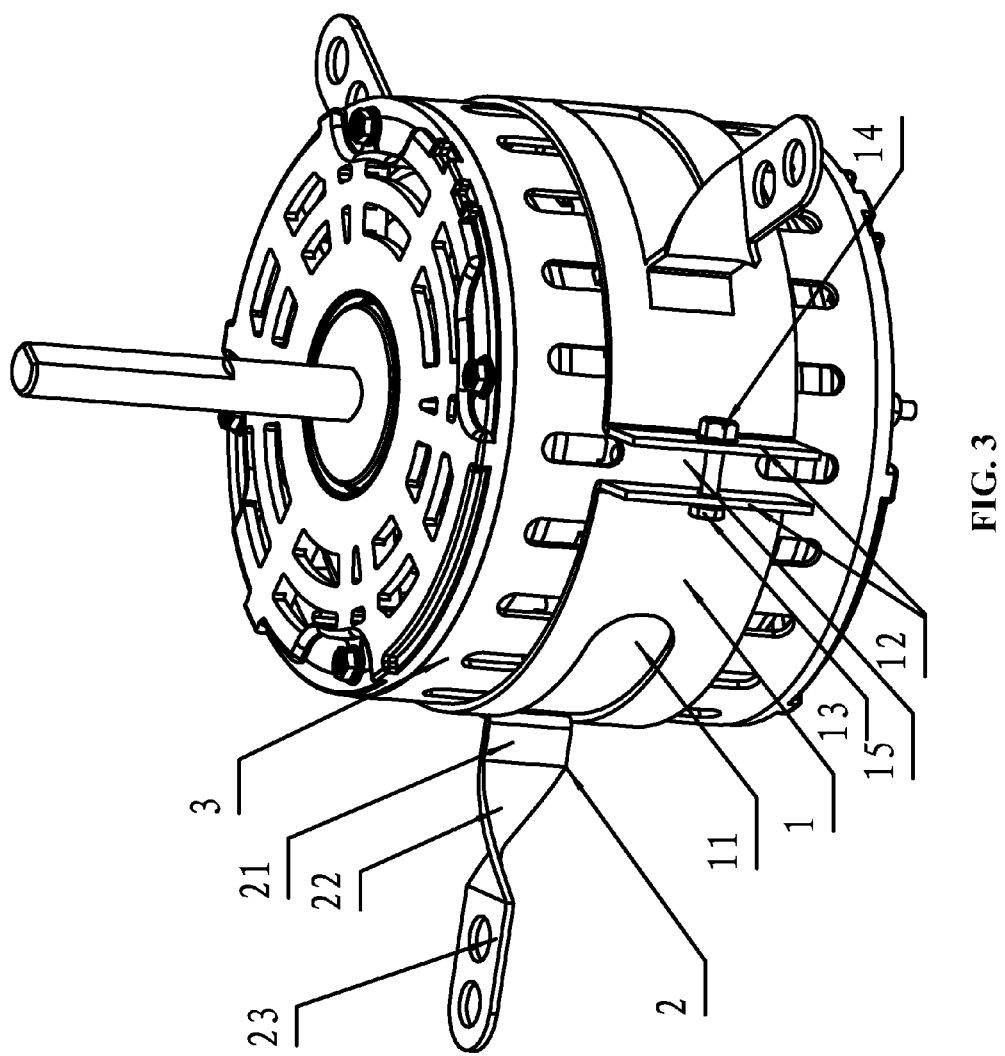
FIG. 3 is a three-dimensional assembly diagram of a mounting bracket for a motor in accordance with one embodiment of the invention with a motor.

As shown in FIGS. 1-3, the mounting bracket for a motor of the invention is assembled with a motor as follows: the hoop structure 1 encircles a motor casing 3 and tightly clings to the outer surface of the motor casing 3. When the locking device is adjusted to an appropriate size, the clamping plates 12 will tightly lock the motor by the bolt 13 and the nut 14. Such structure is simpler and more cost-effective except that fewer materials are required and the connection is more reliable compared to conventional mounting brackets. It is an extremely versatile structure and applicable to different types of motors.

Example 2

Figure 4:
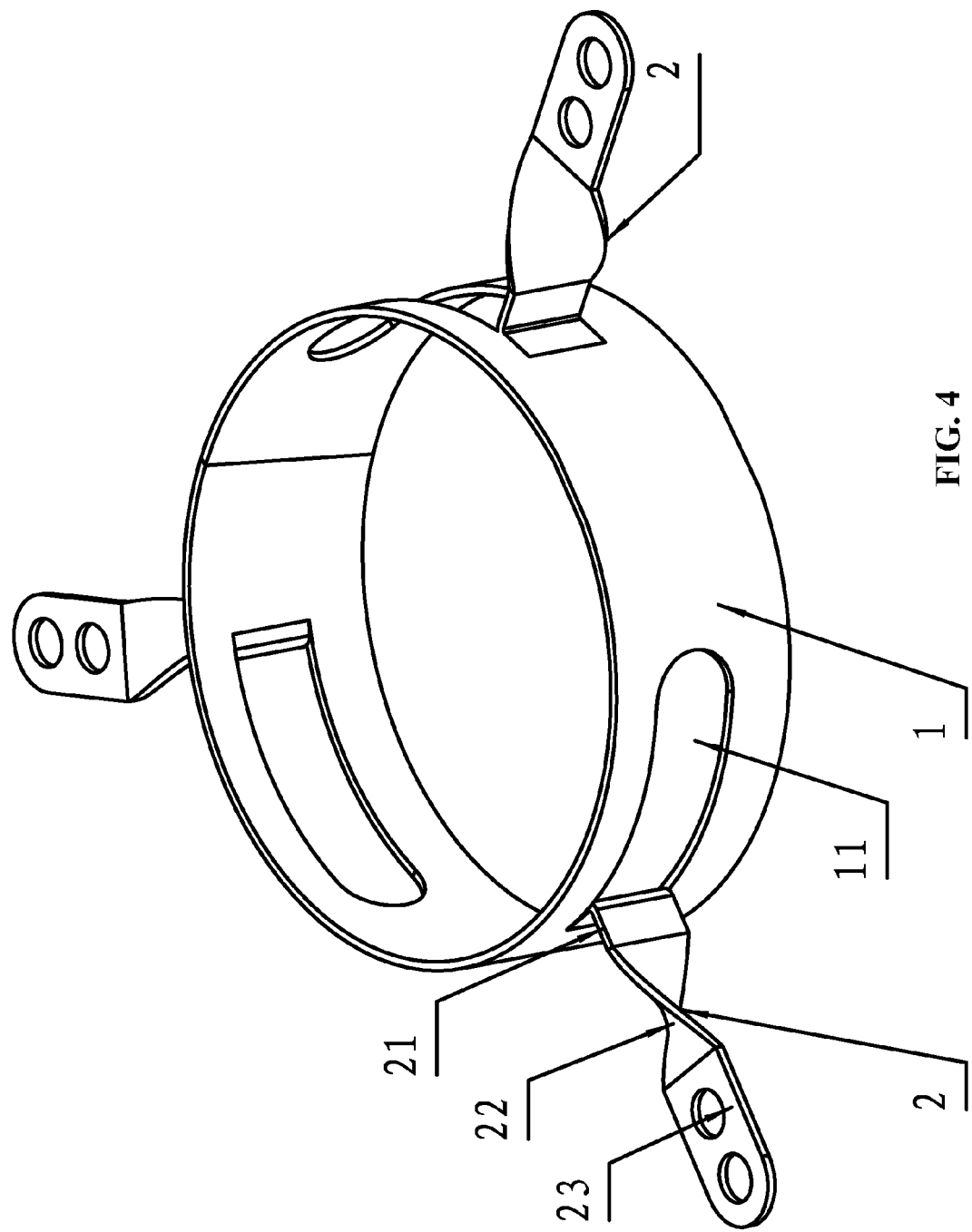
FIG. 4 is a three-dimensional diagram of a mounting bracket for a motor in accordance with another embodiment of the invention.
Figure 5:
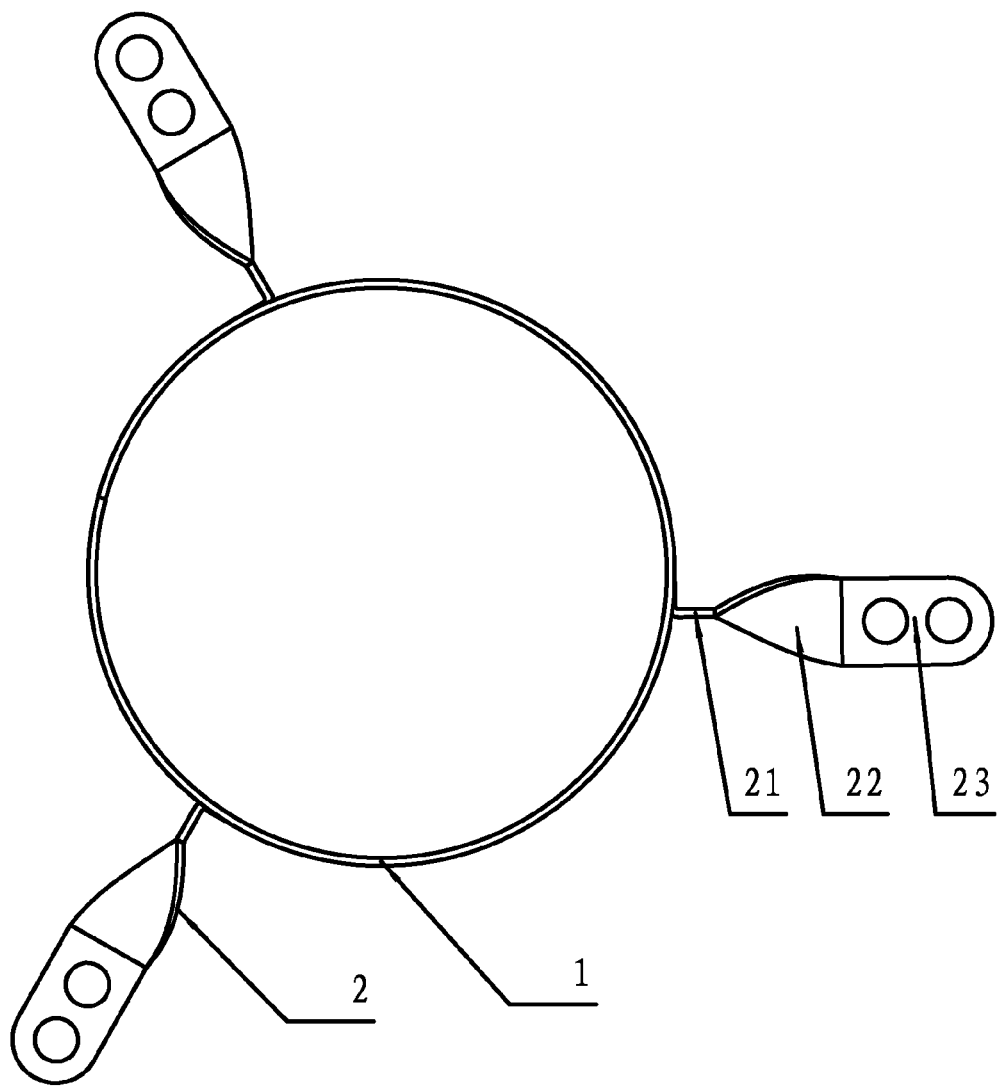
FIG. 5 is a front view of a mounting bracket for a motor in accordance with another embodiment of the invention.

As shown in FIGS. 4 and 5, a mounting bracket for a motor of the invention comprises a hoop structure 1 and a plurality of mounting feet 2. The wall surface of the hoop structure 1 is punched to produce a plurality of mounting feet 2, and thus a plurality of grooves 11 close to the mounting feet 2 is formed on the wall surface of the hoop structure 1 and one end of each mounting foot is coupled to the wall surface of the hoop structure 1. The hoop structure 1 is in a closed annular shape encircling the surface of the motor casing and an interference fit is achieved between the hoop structure 1 and a motor casing 3. The mounting feet 2 each comprises a fixed part 21, a middle connecting part 22, and a mounting part 23. One end of the fixed part 21 is coupled to the hoop structure 1 and the other end is coupled to the middle connecting part 22. An outer end of the middle connecting part 22 is coupled to the mounting part 23 and the middle connecting part 22 is in a twisted shape. The mounting feet 2 are in the same section of the wall surface of the hoop structure 1 and spaced apart along the circumferential direction. The number of the mounting feet 2 is three and two adjacent mounting feet 2 form an angle of 120°.

Figure 6:
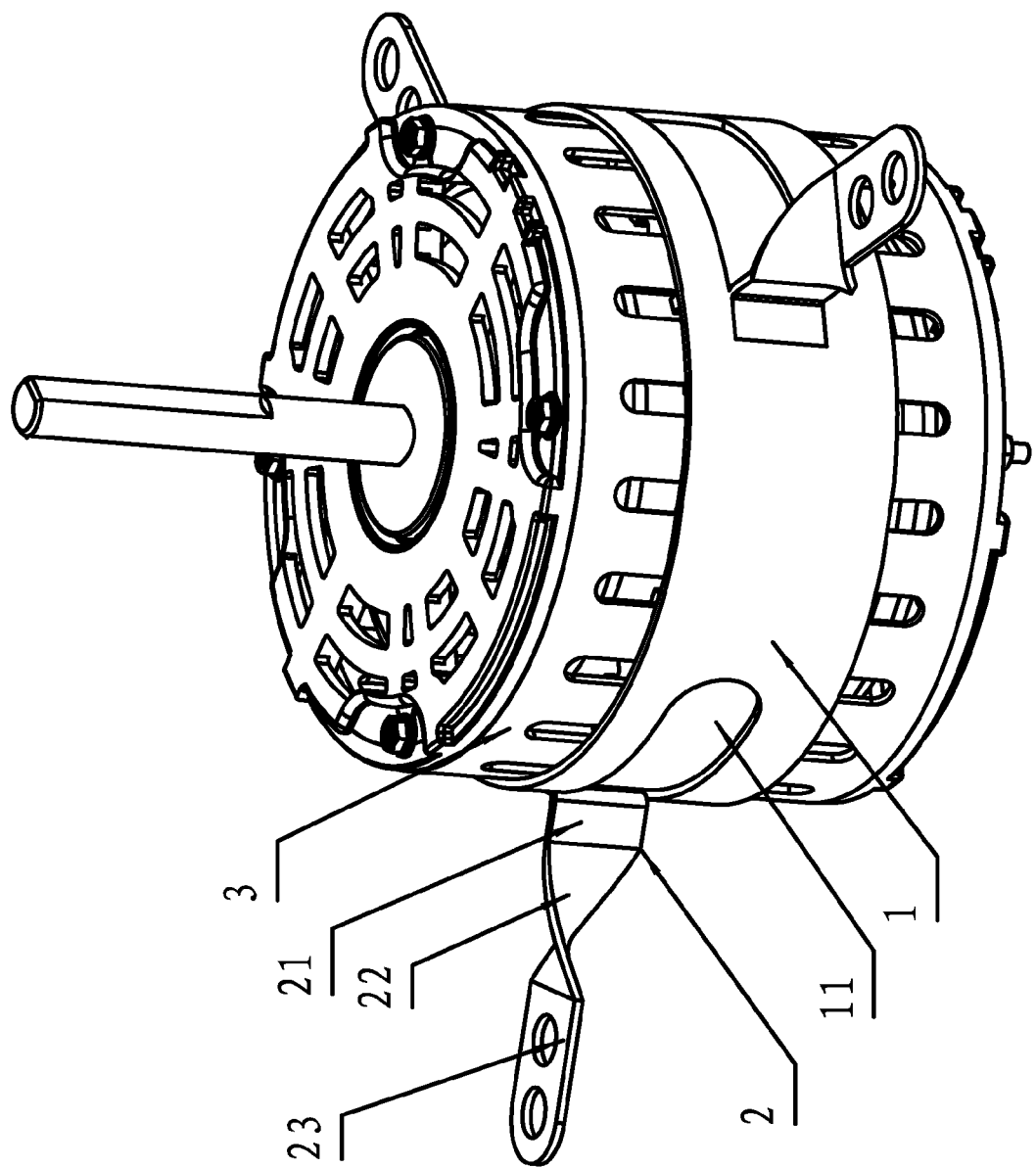
FIG. 6 is a three-dimensional assembly diagram of a mounting bracket for a motor in accordance with another embodiment of the invention with a motor.

As shown in FIGS. 4-6, the mounting bracket for a motor of the invention is assembled with a motor as follows: for specific models of motors, the mounting brackets have to be made accordingly with the matching size. Afterwards, the hoop structure 1 directly encircles the motor casing 3 and tightly clings to the outer surface of the motor casing 3. Such structure is simple, installation friendly, and can be produced with high efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A mounting bracket for a motor, the mounting bracket comprising: a) a hoop structure comprising a wall surface; and b) a plurality of mounting feet; wherein: the wall surface comprises a first rim and a second rim; the plurality of the mounting feet protrudes from the middle of the wall surface of the hoop structure; a plurality of grooves adjacent to the plurality of the mounting feet is disposed on the wall surface of the hoop structure; one end of each of the plurality of the mounting feet is coupled to the wall surface of the hoop structure and is adjacent to the corresponding groove; and the one end of each of the plurality of the mounting feet and the plurality of grooves are spaced from the first rim and from the second rim; wherein: each of the plurality of the mounting feet comprises a fixed part, a middle connecting part, and a mounting part; the middle connecting part comprises an inner end and an outer end; one end of the fixed part is coupled to the hoop structure and the other end of the fixed part is coupled to the inner end the middle connecting part; the outer an outer end of the middle connecting part is coupled to the mounting part; any the fixed part is substantially perpendicular to the mounting part; an outer surface of the other end of the fixed part is in parallel to an outer surface of the inner end; an outer surface of the mounting part is in parallel to an outer surface of the outer end; and the middle connecting part is in a twisted shape and has a twist angle of substantially 90°.

2. The mounting bracket of claim 1, wherein the hoop structure is in a closed annular shape encircling the surface of a motor casing and the hoop structure is connected with the motor casing using an interference fit.

3. The mounting bracket of claim 1, wherein:
the hoop structure is in an annular shape having an opening and is arranged with a locking device; and
the locking device comprises two clamping plates disposed at the opening of the hoop structure, and the two clamping plates are tightly locked together using a bolt and a nut.

4. The mounting bracket of claim 1, wherein the mounting feet are in the same section of the wall surface of the hoop structure and spaced apart along the circumferential direction.

5. The mounting bracket of claim 2, wherein the mounting feet are in the same section of the wall surface of the hoop structure and spaced apart along the circumferential direction.

6. The mounting bracket of claim 3, wherein the mounting feet are in the same section of the wall surface of the hoop structure and spaced apart along the circumferential direction.

7. The mounting bracket of claim 1, wherein a number of the mounting feet is three and two adjacent mounting feet form an angle of 120°.

8. The mounting bracket of claim 2, wherein a number of the mounting feet is three and two adjacent mounting feet form an angle of 120°.

9. The mounting bracket of claim 3, wherein a number of the mounting feet is three and two adjacent mounting feet form an angle of 120°.

10. The mounting bracket of claim 3, wherein the hoop structure encircles the motor casing and the motor is locked by the locking device.

11. In a mounting bracket for a motor, the mounting bracket comprising a hoop structure and a plurality of mounting feet; the hoop structure comprising a wall surface; the improvement comprising: the wall surface comprises a first rim and a second rim; the plurality of the mounting feet protrudes from the middle of the wall surface of the hoop structure; so that a plurality of grooves adjacent to the plurality of the mounting feet are disposed on the wall surface of the hoop structure; one end of each of the plurality of the mounting feet being coupled to the wall surface of the hoop structure and being adjacent to the corresponding groove; and the one end of each of the plurality of the mounting feet and the plurality of grooves being spaced from the first rim and from the second rim; wherein: each of the plurality of the mounting feet comprises a fixed part, a middle connecting part, and a mounting part; the middle connecting part comprises an inner end and an outer end; one end of the fixed part is coupled to the hoop structure and the other end of the fixed part is coupled to the inner end the middle connecting part; the outer an outer end of the middle connecting part is coupled to the mounting part; the fixed part is substantially perpendicular to the mounting part; an outer surface of the other end of the fixed part is in parallel to an outer surface of the inner end; an outer surface of the mounting part is in parallel to an outer surface of the outer end; and the middle connecting part is in a twisted shape and has a twist angle of substantially 90°.

12. The mounting bracket of claim 1, wherein the one end of each of the plurality of the mounting feet and the plurality of grooves are spaced from the first rim in a direction toward the second rim and are spaced from the second rim in a direction toward the first rim.

13. The mounting bracket of claim 11, wherein the one end of each of the plurality of the mounting feet and the plurality of grooves are spaced from the first rim in a direction toward the second rim and are spaced from the second rim in a direction toward the first rim.

* * * * *